R. LYTTLE.
UNIVERSAL DIRECTION CONTROL FOR VEHICLE HEADLIGHTS.
APPLICATION FILED APR. 24, 1916.
1,230,422.
Patented June 19, 1917.
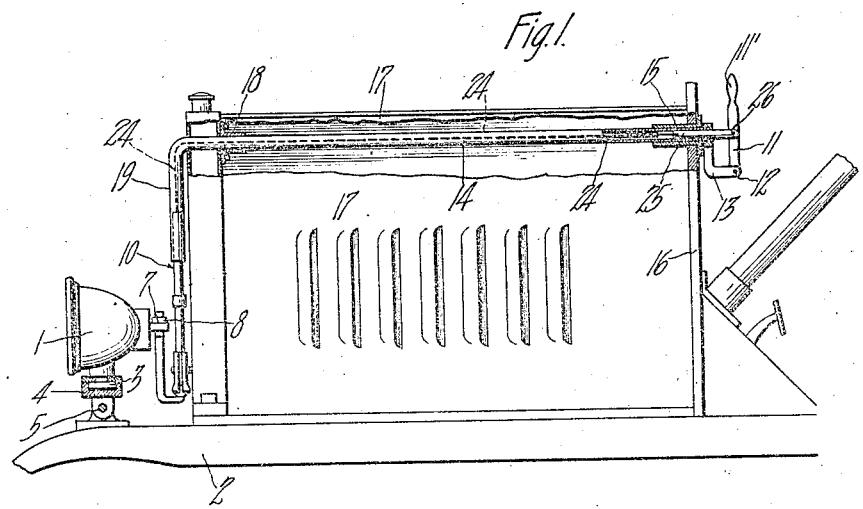
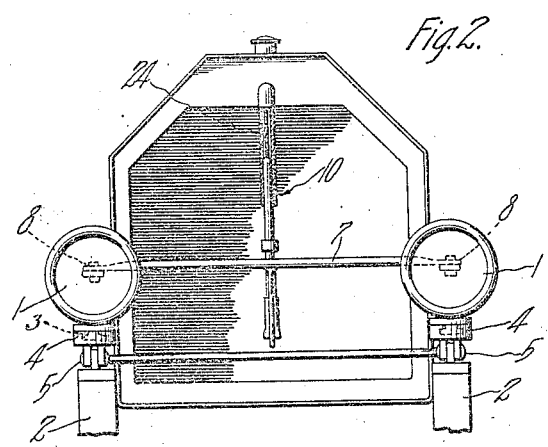
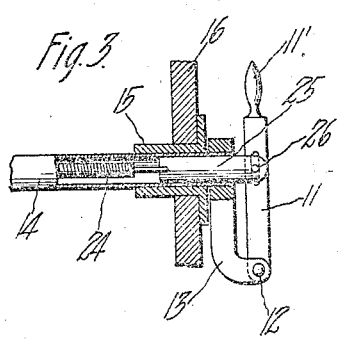
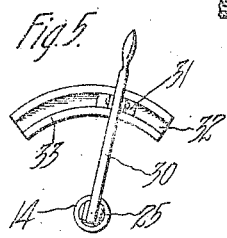
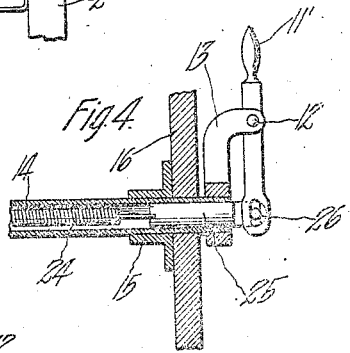
Inventor
Rowland Lyttle
by Arthur P. Knight
his Attorney

UNITED STATES PATENT OFFICE.

ROWLAND LYTTLE, OF LOS ANGELES, CALIFORNIA, ASSIGNOR OF ONE-HALF TO EDWARD JESURUN, OF PALO ALTO, CALIFORNIA.

UNIVERSAL DIRECTION CONTROL FOR VEHICLE-HEADLIGHTS.

1,230,422.  Specification of Letters Patent.  Patented June 19, 1917.

Application filed April 24, 1916. Serial No. 93,141.

*To all whom it may concern:*

Be it known that I, ROWLAND LYTTLE, a citizen of the United States, residing in the city of Los Angeles, county of Los Angeles, and State of California, have invented a new and useful Universal Direction Control for Vehicle-Headlights, of which the following is a specification.

This invention relates to means for controlling the direction of headlights for automobiles or other vehicles, and the main object of the invention is to provide means whereby both vertical and horizontal movements of the headlights may be controlled by a single operating means so that the chauffeur or operator can swing the headlights vertically or horizontally by operation of one hand.

The accompanying drawings illustrate embodiments of my invention, and referring thereto, Figure 1 is a partly broken side elevation of an automobile hood provided with my device.

Fig. 2 is a partly broken front elevation thereof.

Fig. 3 is a vertical section of the controlling device.

Fig. 4 is a vertical section of a modified form of the controlling device.

Fig. 5 is a vertical section of another form of the controlling device.

Referring to Figs. 1 and 2, the automobile headlights, indicated at 1, are mounted on the frame 2 of the vehicle by pivotal connections providing for both vertical and horizontal swinging movements of the headlights. For this purpose each headlight may be swiveled or pivoted at 3 on a bracket 4 which is mounted on a shaft 5 extending across the frame 2 and connecting the brackets 4 so that the headlights will swing vertically in unison. A bar 7 is pivoted at 8 to each headlight so as to cause said headlights to swing horizontally in unison.

Connected to the bar 7 or to any other part in connection with either of the headlights is an operating member 10 connected to a controlling device 11 in such manner that said operating member may be moved horizontally or vertically by different movements of said controlling device 11. Said controlling device 11 may consist of a lever pivoted at 12 on arm 13 extending from a tubular member 14 formed as a rigid pipe which is mounted in bearing 15 on dashboard 16 of the vehicle. Said tubular member 14 is formed preferably as a pipe which extends forwardly through the hood 17 of the vehicle and through a bearing 18 at the front of said hood and then down as indicated at 19 to form an arm which swings from side to side as the tubular member 14 is rocked by means of the lever 11, the pivotal connection 12 of said lever to bracket 13 being such as to permit the lever 11 to swing forward on said bracket in a direction perpendicular to the dash-board 16 and parallel to the axis of the tubular member 14, but to cause the tubular member 14 to rock when the lever 11 is swung in a plane parallel to said dash-board and transverse to the axis of tubular member 14. The operating member may consist of a slide member 10 which slides vertically in the tubular arm 19. A flexible connection 24 extends from said slide member 10 to a slide member 25 mounted in the tubular member 14 adjacent to the lever 11 and pivoted to said lever as indicated at 26. Said flexible member 24 may consist of a wire, for example, piano wire inclosed by and slidably mounted in a flexible tubular casing formed, for example, of coiled wire in the manner of the so called "Bowden" wire. It will be noted that the mounting of the operating lever 11 is such as to provide for universal movement thereof, and the connections between the said lever and the headlights are such as to permit the swinging movement of the headlights in either direction without interfering with their movement in the other direction.

The operation is as follows:—To swing the headlights 1 in a vertical direction the operator tilts or moves the lever 11 forwardly or backwardly by handle means 11' thereon, in a plane parallel to the axis of tubular member 14, and thereby causes the slide 26 to move in the tubular member 14 so as to operate through the Bowden wire or flexible member 24 to raise or lower the bar 8. If movement in a horizontal direction is desired, the lever 11 is swung in a vertical plane transverse to tubular member 14 or vertically rotated parallel to the dashboard, thereby causing the arm 19 to operate through the link or operating member 10 to move the bar 8 laterally and swing the headlights in one direction or the other.

Any kind of lever means may be used in place of the one shown in Fig. 1. For example, the lever may be reversely placed as shown in Fig. 4, the construction being otherwise the same. Or the operating lever, as shown at 30 in Fig. 5, may be pivoted at one end to the sliding member 25 and intermediate its length to a slide 31 which moves in a quadrant groove or guide 32 in a member 33 fixed on the dash-board, so that, by swinging the handle member 33 around in said groove the tubular member 14 may be rocked to move the headlights laterally, and by rocking the lever 30 forwardly or backwardly on its pivot 31 the slide member 5 may be moved within the tubular member 14 to produce vertical adjustment of the headlights.

What I claim is:—

1. A universal directing means for a vehicle headlight comprising a universal bearing support for the headlight, a rotatably mounted rigid tubular member, a lever hinged on said tubular member to turn therewith in transverse movement of the lever, and to turn thereon in movement of the lever in a plane parallel to the axis of said tubular member, and a member extending longitudinally within said tubular member and guided therein, and connected to the bearing support for the headlight and to said lever, to turn the headlight vertically in movement of the lever in a plane parallel to the axis of said tubular member, and said tubular member being adapted to turn the headlight horizontally in transverse movement of the lever.

2. The combination of two vehicle headlights, universal bearing supports therefor, a member extending crosswise of the vehicle and pivotally connected to said bearing supports to operate the headlights in unison in both horizontal and vertical movements, a tubular member mounted to rock on its longitudinal axis, a lever hinged on said tubular member to rock therewith but to turn thereon in a plane parallel to said longitudinal axis of said tubular member, a sliding member extending longitudinally within said tubular member and sliding therein, and connected to said lever to be operated by the movement of said lever in a plane parallel to the axis of the tubular member, and means connecting said tubular member and said sliding member to the aforesaid member extending crosswise of the vehicle and connected to the universal supports for the headlights to operate the headlights horizontally in rocking movement of said tubular member and to operate the headlights vertically in the longitudinal sliding movement of said sliding member.

3. Universal bearing supports for the headlights, a bar pivotally connected thereto to operate the same in unison, a rockingly mounted tubular member connected to said bar to turn the headlights horizontally, a lever pivotally mounted on said rocking member to move at right angles to the plane of rotation of said rocking member, a flexible member connected to said lever and extending within said rocking member and connected to the headlight to turn the same vertically on movement of said lever on said rocking member, said lever being connected to the rocking member to rock the same on movement of the lever in the plane of rotation of the rocking member.

4. Universal bearing supports for the headlights, a bar pivotally connected thereto to operate the same in unison, a rocking member formed as a rigid tube, means connecting said rocking member to the said bar to swing the headlights horizontally on rocking movement of said rocking member, a flexible member sliding longitudinally within said rocking member and connected to the headlight to operate the same vertically on longitudinal movement of said flexible member, and a lever mounted on said rocking member to rock said rocking member in one direction of movement of said lever, said lever being connected to the flexible member to operate the same longitudinally in another direction of movement of said lever.

5. A universal directing means for vehicle headlights, comprising a universal bearing support for the headlight, a rocking tubular member having a tubular arm, a flexible member connected to operate said headlight and extending through the tubular arm and through the tubular rocking member, and a lever pivotally mounted on said rocking member and adapted to rotate the rocking member by movement of the said lever in one direction and connected to operate said flexible member by pivotal movement of said lever on said rocking member.

In testimony whereof I have hereunto set my hand, at Los Angeles, California, this 13th day of April, 1916.

ROWLAND LYTTLE.